United States Patent Office 3,433,080
Patented Mar. 18, 1969

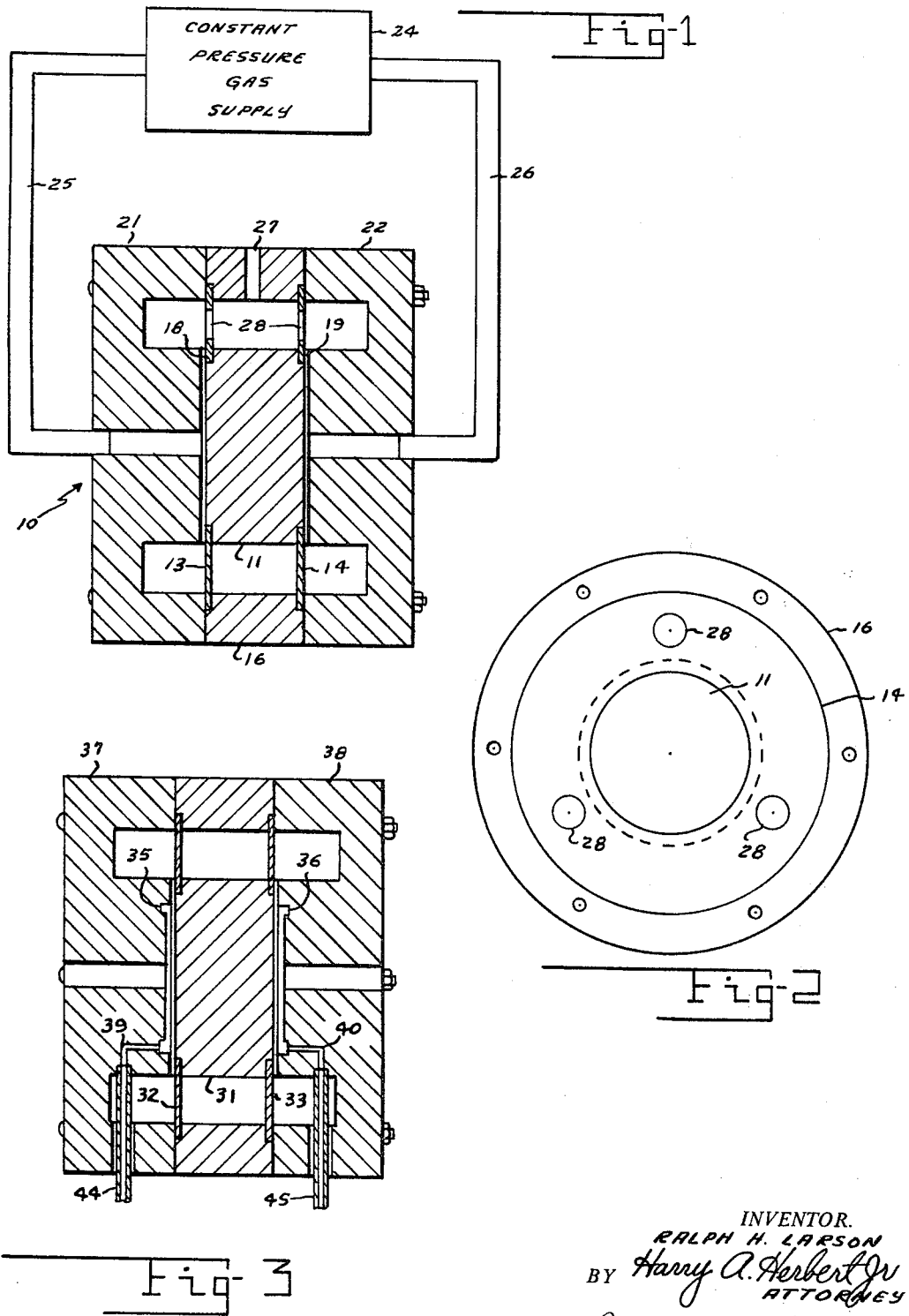

3,433,080
PNEUMATIC ACCELERATION SENSOR
Ralph H. Larson, Wilmette, Ill., assignor, by mesne assignments, to the United States of America as represented by the Secretary of the Air Force
Filed June 2, 1966, Ser. No. 554,810
U.S. Cl. 73—515
Int. Cl. G01p *15/00*
3 Claims

ABSTRACT OF THE DISCLOSURE

An inertial mass is supported on flexible supports between two apposed gas thrust bearings. When a gas from a constant pressure gas supply is supplied to the two gas thrust bearings, the increase in flow due to displacement of the inertial mass from its central position provides an output signal proportional to acceleration. By providing annular pick-off recesses adjacent each of the thrust bearings, a differential output signal is produced.

---

This invention relates to a pneumatic acceleration sensing device for use in fluidic systems.

One object of the invention is to provide a pneumatic acceleration sensing device of a more rugged construction than prior art devices.

Another object of the invention is to provide a pneumatic acceleration sensing device which is easily fabricated.

These and other objects will be more fully understood from the following detailed description taken with the drawing, wherein:

FIG. 1 is a sectional view of an acceleration sensing device, partially in block form, according to the invention;

FIG. 2 is a right end view of the device of FIG. 1 with one of the end plates removed; and FIG. 3 is a sectional view of another modification of the acceleration sensing device according to the invention.

Devices used in space vehicles require rugged construction, high reliability and low power consumption. According to this invention, an inertial mass is radially supported by means of two annular disks between two apposed gas thrust bearings. The annular disks provide high lateral and angular stiffness and low axial stiffness so as not to interfere with the operation of the gas thrust bearings. The net rate flow through the gas thrust bearing system is sensitive to the displacement of the inertial mass from the central position, with a displacement in either direction resulting in an increase in total flow.

Reference is now made to FIG. 1 of the drawing wherein numeral 10 refers to a pneumatic accelerometer having a cylindrical inertial mass 11 supported radially by means of two annular flexure supports 13 and 14, within a spacer ring member 16. End spaces 18 and 19 are provided between the inertial mass 11 and end plates 21 and 22 to provide two apposed gas thrust bearings which axially support the inertial mass. Gas is supplied to the gas thrust bearings from a constant pressure gas supply 24 through supply tubes 25 and 26. The annular flexure supports 13 and 14 are clamped between end plates 21 and 22 and the spacer ring member 16 and are fixed to the inertial mass 11 in any well-known manner such as by a press fit. An output signal may be taken off at output port 27. Openings 28 are provided in the flexure supports 13 and 14 to permit flow to the output port 27. The main parts of the accelerometer may be made of tool steel and a material that may be used for the flexure supports is stainless steel shim stock.

In the operation of the device, a gas, at a constant pressure is supplied to the thrust bearings end spaces 18 and 19 through supply tubes 25 and 26, and provides axial support for the inertial mass 11. The flow rate through the gas thrust bearing system is sensitive to a displacement of the inertial mass from its central position as a result of an acceleration of the device. The increase in flow rate due to the displacement of the inertial mass from its central position will appear at the output port 27 as an output signal proportional to acceleration.

The device thus far described will measure the magnitude but not the direction of the acceleration vector. The device of FIG. 3 makes it possible to sense the direction of the acceleration vector as well as the magnitude.

In this device, the inertial mass 31 is supported by flexure supports 32 and 33. Openings such as 28 are not needed in these supports. Annular pressure pick-off recesses 35 and 36 are provided in end plates 37 and 38, respectively. Pressure sensing channels 39 and 40 are also provided in the end plates 37 and 38. A differential output signal is provided between the outputs of pressure sensing channels 39 and 40 which may be applied to an indicating device or may be used as a control signal. Tubes 44 and 45 may be used to connect the output signal to any desired utilization apparatus. With one device built and tested, using a supply pressure of 147 p.s.i.a. and with the output measured with a Dynisco PT35-50 differential pressure transducer, excellent linearity was obtained in the performance of the device over the complete operating range.

There is thus provided a pneumatic accleration sensing device which is more rugged and easier to fabricate than prior art devices.

While certain specific embodiments have been described, it is obvious that numerous changes may be made without departing from the general principle and scope of the invention.

I claim:
1. A pneumatic acceleration sensing device, comprising a cylindrical shaped inertial mass; an annular spacing ring member surrounding said inertial mass; means for flexibly supporting said inertial mass within said spacing ring member; means for providing a gas thrust bearing at each end of said inertial mass; means for providing a flow of gas through said gas thrust bearings and means for providing an output signal proportional to changes in flow through said thrust bearings in response to movements of said inertial mass.

2. The device as recited in claim 1 wherein said inertial mass is supported within said spacing member by means of a pair of annular flexure support disks.

3. The device as recited in claim 2 wherein said means for providing a gas thrust bearing at each end of said inertial mass is a pair of end members each spaced from the end of said inertial mass with each of said end members having a central air passage therethrough; an annular pressure pick-off recess in each of said end members; a pressure sensing output passage in communication with each of said pick-off recesses in each of said end members.

References Cited
UNITED STATES PATENTS 3,065,639 11/1962 Stedman _____ 73—515
3,315,531 4/1967 Grimland _____ 73—515

VERLIN R. PENDEGRASS, *Primary Examiner.*

U.S. Cl. X.R.
335—301; 336—84